(12) United States Patent
Marukawa et al.

(10) Patent No.: US 7,807,284 B2
(45) Date of Patent: Oct. 5, 2010

(54) FAN STRUCTURE AND BATTERY PACK USING THE SAME

(75) Inventors: Shuhei Marukawa, Aichi (JP); Masahiro Misu, Aichi (JP); Toyohiko Eto, Aichi (JP)

(73) Assignee: Panasonic EV Energy Co., Ltd., Kosai-Shi (JP)

( * ) Notice: Subject to any disclaimer, the term of this patent is extended or adjusted under 35 U.S.C. 154(b) by 830 days.

(21) Appl. No.: 11/350,821

(22) Filed: Feb. 10, 2006

(65) Prior Publication Data
US 2006/0181247 A1 Aug. 17, 2006

(30) Foreign Application Priority Data
Feb. 16, 2005 (JP) ............................. 2005-039376

(51) Int. Cl.
*H01M 2/10* (2006.01)

(52) U.S. Cl. ..................................... 429/96; 416/204 R

(58) Field of Classification Search ........................ None
See application file for complete search history.

(56) References Cited

U.S. PATENT DOCUMENTS

| | | | |
|---|---|---|---|
| 3,267,928 A | 8/1966 | Spooner et al. | |
| 4,138,859 A | 2/1979 | Pietsch | |
| 4,633,112 A * | 12/1986 | Miyake | .................. 310/90 |
| 5,320,190 A | 6/1994 | Naumann et al. | |
| 5,937,664 A | 8/1999 | Matsuno et al. | |
| 6,220,383 B1 | 4/2001 | Muraki et al. | |
| 2004/0232891 A1* | 11/2004 | Kimoto et al. | .............. 320/150 |

FOREIGN PATENT DOCUMENTS

JP 55-112100 8/1980

OTHER PUBLICATIONS

Schreiber Translation, Inc. written translation of JP55112100, published Aug. 6, 1980, translated Jul. 2009.*
Official translation of JP55112100, published Aug. 6, 1980, translated by Akiko Smith of U. S. Patent and Trademark Office.*

* cited by examiner

*Primary Examiner*—Dah-Wei D Yuan
*Assistant Examiner*—Maria J Laios
(74) *Attorney, Agent, or Firm*—Workman Nydegger

(57) ABSTRACT

A fan structure is provided, which includes: a fan case having an inlet and an outlet; a bladed wheel provided inside the fan case; a motor for rotating the bladed wheel; a circuit substrate for controlling the motor; and a scroll housing formed between the fan case and the bladed wheel. Rotation of the bladed wheel causes a fluid to enter the scroll housing from the inlet and to exit from the outlet. The circuit substrate and the motor are arranged inside the fan case. The fan structure further includes a waterproof member for dividing the motor and the circuit substrate from the scroll housing, and a cylindrical seal for sealing a hole formed in the waterproof member through which an output shaft of the motor extends. The fan structure is compact and prevents adhesion of salt, water, or dust to the built-in circuit substrate.

10 Claims, 6 Drawing Sheets

FAN STRUCTURE AND BATTERY PACK USING THE SAME

The present disclosure relates to subject matter contained in priority Japanese Patent Application No. 2005-039376 filed on Feb. 16, 2005, the contents of which is herein expressly incorporated by reference in its entirety.

BACKGROUND OF THE INVENTION

1. Field of the Invention

The present invention relates to a fan structure with improved waterproof properties designed for applications where sucked air contains water, and a battery pack using this fan structure.

2. Description of the Related Art

A battery pack consists of a battery assembly made of a plurality of rechargeable batteries and a charge/discharge control unit. To prevent a decrease in power output or battery life due to the heat that accompanies the charge and discharge of the batteries, some battery packs include cooling passages between adjacent batteries and a fan for supplying and discharging a cooling fluid to and from the cooling passages via supply and discharge passages.

A battery pack 41 shown in FIG. 7, for example, consists of a battery unit 45, a charge/discharge control unit 48 arranged on one side of the battery unit 45, and a fan unit 49 arranged on the other side of the battery unit 45, these units being accommodated in an outer case 50. The battery unit 45 includes a battery assembly 42, which consists of a plurality of parallel arranged rechargeable batteries 43 with cooling passages formed therebetween, a supply passage 46 above the batteries for feeding cooling air, and a discharge passage 47 below the batteries for discharging the cooling air.

At one end in the upper part of the fan unit 49 is opened an outside air inlet 51a, which connects to an outside air introducing passage 51 that communicates with the supply passage 46 at the opposite end from the air inlet. A fan 52 is arranged below, and a connection duct 54 is provided for connecting an inlet 53 opened in the lower face of the fan 52 with the discharge passage 47.

FIG. 8 shows the fan 52 in more detail. A base plate 55 is arranged at the top, and a motor 57 and a circuit substrate 56 for controlling the motor are mounted to the lower face of the base plate 55. A bladed wheel 59 is secured to the output shaft 58 of the motor 57. A fan case 60 or scroll housing encases these circuit substrate 56, motor 57, and bladed wheel 59. The open end 60a at the top of the fan case 60 is secured to the base plate 55. The inlet 53 is coaxial with the bladed wheel 59 and opened in the lower face of the fan case 60. The outlet 61 of the fan case 60 is connected to an exhaust duct outside the battery pack 41.

Operating the motor 57 of the fan 52 introduces cooling air from the outside air inlet 51a, which passes through the supply passage 46 and cooling passages for heat exchange with the rechargeable batteries 43. After cooling the batteries 43, the air is sucked through the discharge passage 47 into the inlet 53 of the fan 52, expelled from the outlet 61 by the pumping action of the bladed wheel 59 and scroll housing, and exhausted to the outside through an exhaust duct. A temperature rise of the rechargeable batteries 43 is thus prevented.

Japanese Utility Model Laid-Open Publication No. 55-112100 shows a waterproof structure of an electric fan used for cooling a condenser or the like of a car cooler. To protect the output shaft bearing from water or mud, cylindrical waterproof walls extend from the fan secured to the output shaft of the motor to the end face and to the outside of the motor, and disc-like waterproof barriers extend radially from both end faces of the motor, whereby labyrinths are formed in the path from outside to the bearing of the output shaft.

The fan 52 shown in FIG. 8 is reduced in size in the up and down directions because of the design wherein the circuit substrate 56 is arranged between the base plate 55 and the motor 57. It is therefore suitable for an application with space limitations such as a battery pack mounted on a vehicle. On the other hand, when the driver drives the car along a coast road, for example, at a stormy or windy time, the cooling air introduced from the inlet 53 may contain seawater mist. Also, the cooling air may contain moisture or dust if the car is driven under harsh environments. In such cases, because the circuit substrate 56 is exposed to the cooling air currents, there is a danger that short-circuiting or other malfunctions may occur due to salt, water, or dust adhered to the circuit substrate 56.

The waterproof structure shown in Japanese Utility Model Laid-Open Publication No. 55-112100 is a structure which consists of labyrinths formed in the path from outside to the output shaft bearing to prevent entrance of water or the like into the output shaft bearing, and not applicable to the fan shown in FIG. 8.

SUMMARY OF THE INVENTION

In view of the above problems in the conventional techniques, an object of the present invention is to provide a battery pack, and a fan structure for preventing adhesion of salt, water, or dust to the built-in circuit substrate of a compactly-structured fan that is used in the battery pack.

To achieve the above object, the present invention provides a fan structure comprising a fan case having an inlet and an outlet, a bladed wheel provided inside the fan case, a motor for rotating the bladed wheel, a circuit substrate for controlling the motor, and a scroll housing formed between the fan case and the bladed wheel. Rotation of the bladed wheel causes a fluid to enter the scroll housing from the inlet and to exit from the outlet. The motor and the circuit substrate are arranged inside the fan case. The fan structure includes a waterproof member for dividing the motor and the circuit substrate from the scroll housing, and a sealing part for sealing a hole formed in the waterproof member through which the output shaft of the motor extends.

With this structure, a compact fan design is realized wherein the circuit substrate, the motor, and the bladed wheel are accommodated in the fan case. As the motor and the circuit substrate are divided by the waterproof member from the scroll housing where a fluid flows, even when sucked fluid contains salt, water, or dust such as seawater mist, short-circuiting or other malfunctions that may be caused by adhesion of salt, water, or dust on the circuit substrate are prevented.

Preferably, the fan case includes a base plate opposite the inlet, and the motor, the circuit substrate, and the waterproof member are secured to this base plate. This simplifies the attachment of these components and improves assembling efficiency.

The sealing part may be composed of a sealing member that is secured to the output shaft of the motor and covers the hole from the side of the scroll housing, whereby the waterproof member does not make contact with the motor output shaft, and yet the sealing part reliably prevents entrance of seawater mist or the like contained in the flowing cooling air into the space shielded by the waterproof member. The waterproof member and the sealing member should preferably form a labyrinth structure for further enhancing the sealing effect.

The base plate of the fan may be arranged at the top, while the inlet of the fan case may be arranged downward. In this case, the sealing part may be composed of a flashing member having a suspended part around the circumference, the flashing member being secured to the output shaft of the motor opposite the hole inside the waterproof member. Even when seawater mist or the like enters the fan through the gap between the waterproof member and motor output shaft, the mist collides with the flashing member, returns downwards, and exits from the gap. Therefore, short-circuiting or other malfunctions that may be caused by adhesion of salt, water, or dust on the circuit substrate are prevented.

To achieve the above object, the present invention further provides a battery pack comprising a battery assembly including a plurality of parallel arranged rechargeable batteries with cooling passages formed between the batteries, a supply passage for supplying a cooling fluid to the cooling passages, a discharge passage for discharging the cooling fluid from the cooling passages, and a fan having the above-described structure arranged on one side of the battery assembly, the inlet being connected to either the supply passage or the discharge passage. The fan is provided in a compact manner in the direction of the rotation axis of the bladed wheel, and accordingly, the battery pack is made compact in the up and down direction which is orthogonal to the parallel arrangement of the rechargeable batteries. Therefore, the fan is particularly suitable for a battery pack that is mounted on a vehicle as its drive power source, because such a battery pack is required to be small in height.

While novel features of the invention are set forth in the preceding, the invention, both as to organization and content, can be further understood and appreciated, along with other objects and features thereof, from the following detailed description and examples when taken in conjunction with the attached drawings.

DETAILED DESCRIPTION OF THE PREFERRED EMBODIMENTS

A battery pack employing a fan structure according to a first embodiment of the present invention will be hereinafter described with reference to FIG. 1 to FIG. 4.

Figure 1:
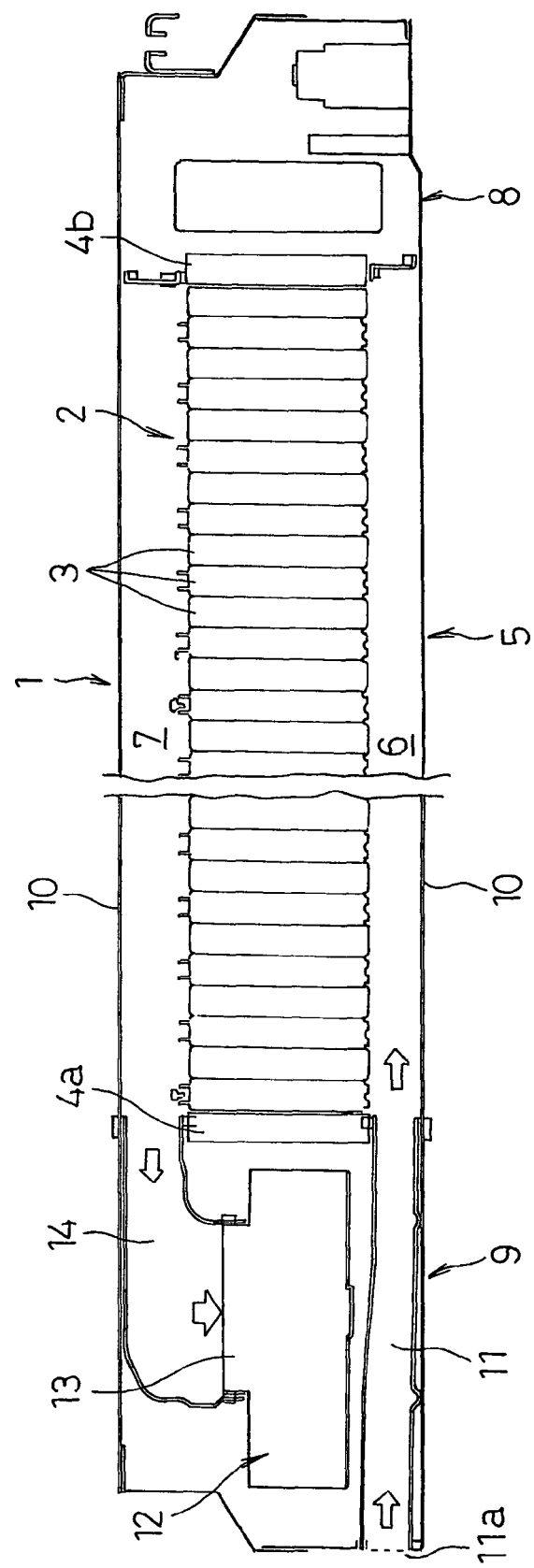
FIG. 1 is a longitudinal cross-sectional front view of a battery pack in which a fan according to a first embodiment of the invention is installed.

The battery pack 1 shown in FIG. 1 is designed for driving a vehicle and accommodates therein a battery assembly 2, which consists of a plurality of parallel arranged rechargeable batteries 3 bound together with end members 4a and 4b at either end. Although not shown, cooling passages are formed between adjacent batteries 3. The battery assembly 2 is located in a battery unit 5, where a supply passage 6 for supplying cooling air to each of the cooling passages is formed below the assembly 2, and a discharge passage 7 for discharging cooling air from the cooling passages is formed above the assembly. On one side of the battery unit 5 is a charge/discharge control unit 8 where devices for the charge/discharge control are arranged, and on the other side of the battery unit 5 is a fan unit 9. The battery pack 1 consists of these battery unit 5, charge/discharge control unit 8, and fan unit 9, all being accommodated in an outer case 10.

In the fan unit 9, an outside air inlet 11a opens at one end in a lower part, and an outside air introducing passage 11 is connected to the supply passage 6 at the opposite end from the inlet. A fan 12 is arranged thereabove, its inlet 13 in the upper face communicating with the discharge passage 7 via a connection duct 14.

Figure 2:
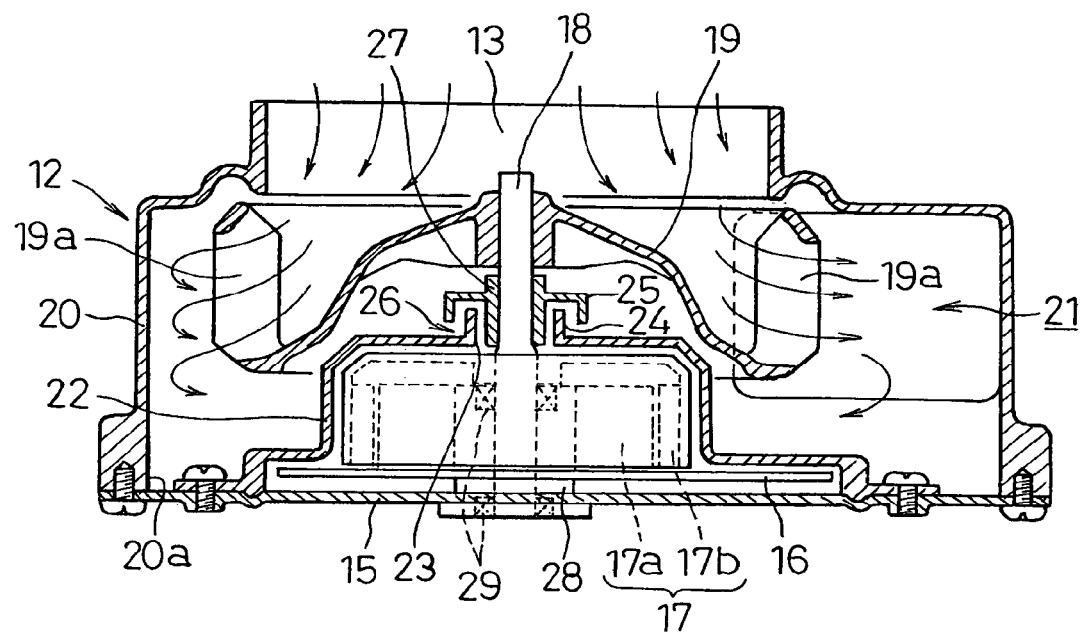
FIG. 2 is a longitudinal cross-sectional front view of the fan of the first embodiment.

As shown in FIG. 2, a base plate 15 is arranged at the bottom of the fan 12, and a motor 17 and a circuit substrate 16 for controlling the motor are mounted on the upper face of the base plate 15. A bladed wheel 19 is secured to the output shaft 18 of the motor 17. The wheel 19 includes a large number of blades 19a arranged along the circumference of a cylinder such as a sirocco fan. A fan case 20 encases these circuit substrate 16, motor, 17, and bladed wheel 19 and forms a scroll housing. The open end 20a at the bottom of the fan case 20 is securely joined to the base plate 15. The base plate 15 thus forms part of the fan case 20 of the fan 12. The inlet 13 is coaxial with the bladed wheel 19 and opened in the upper face of the fan case 20. The outlet 21 opens in the circumferential wall and communicates to an exhaust duct (not shown) for exhausting air to the outside via an exhaust port (not shown) opened in the outer case 10.

On the base plate 15 is attached a waterproof member 22 that extends upward and surrounds the circuit substrate 16 and the motor 17. The output shaft 18 of the motor 17 extends through a hole 23 opened at the top of the waterproof member 22. A cylindrical part 24 extends upward from the hole 23. A cylindrical seal 25 is fixedly attached to the output shaft 18 such as to fit with the cylindrical part 24 with a gap being formed around the circumference and at the top of the cylindrical part 24. These cylindrical part 24 and cylindrical seal 25 form a labyrinth structure 26. In the illustrated example, the attachment boss 27 of the cylindrical seal 25 that is secured to the output shaft 18 extends downward to fit with the inner circumference of the cylindrical part 24 with a gap therebetween.

The lower end of a stationary sleeve 28 is secured to the base plate 15, and the circuit substrate 16 is fixed near the lower end of the stationary sleeve 28 such that the sleeve extends through the substrate. The stator 17a of the motor 17 is securely mounted around the stationary sleeve 28, and the output shaft 18 is rotatably supported by a bearing 29 arranged inside the sleeve 28. The inner circumference of the rotor 17b of the motor 17 is fixedly attached to the output shaft 18.

Operating the motor 17 of the fan 12 causes cooling air to be introduced from the outside air inlet 11a and fed to the cooling passages between adjacent rechargeable batteries 3 of the battery assembly 2 via the outside air introducing passage 11 and the supply passage 6 to cool the batteries 3. After the heat exchange, cooling air is sucked into the inlet 13 of the fan 12, which is a sirocco fan, via the discharge passage 7 and the connection duct 14, expelled from the outlet 21 by the pumping action of the bladed wheel 19 and the scroll housing formed by the fan case 20, and exhausted to the outside through the exhaust duct (not shown). Thus a temperature rise of the rechargeable batteries 3 is prevented, and a decrease of battery output and battery life of the battery pack 1 are prevented.

As the circuit substrate 16, the motor 17, and the bladed wheel 19 are accommodated in the fan case 20, the fan 12, which is a small and high-power sirocco fan, is provided in a compact manner in the direction of the rotation axis of the bladed wheel 19. Accordingly, the battery pack 1 is made compact in the up and down direction which is orthogonal to the parallel arrangement of the rechargeable batteries 3. Therefore, the fan 12 is particularly suitable for a battery pack that is mounted on a vehicle as its drive power source, because such a battery pack is required to be small in height.

Moreover, as the waterproof member 22 shields the cooling air that flows through the space in which the motor 17 and the circuit substrate 16 are located, even when the sucked air contains salt, water, or dust, such as seawater mist, the circuit substrate 16 is protected and short-circuiting or other malfunctions that may be caused by adhesion of such salt, water, or dust are prevented. In particular, the cylindrical part 24 provided to the waterproof member 22 fits with the circumference of the output shaft 18 of the motor 17 with a gap therebetween, and the cylindrical seal 25 provided to the rotating output shaft 18 fits with the circumference of the cylindrical part 24 with a gap. Therefore, the waterproof member 22 does not make contact with the motor output shaft 18, and yet this labyrinth structure 26 formed by the cylindrical part 24 and the cylindrical seal 25 reliably prevents entrance of seawater mist or the like contained in the flowing cooling air into the space shielded by the waterproof member 22.

Figure 3:
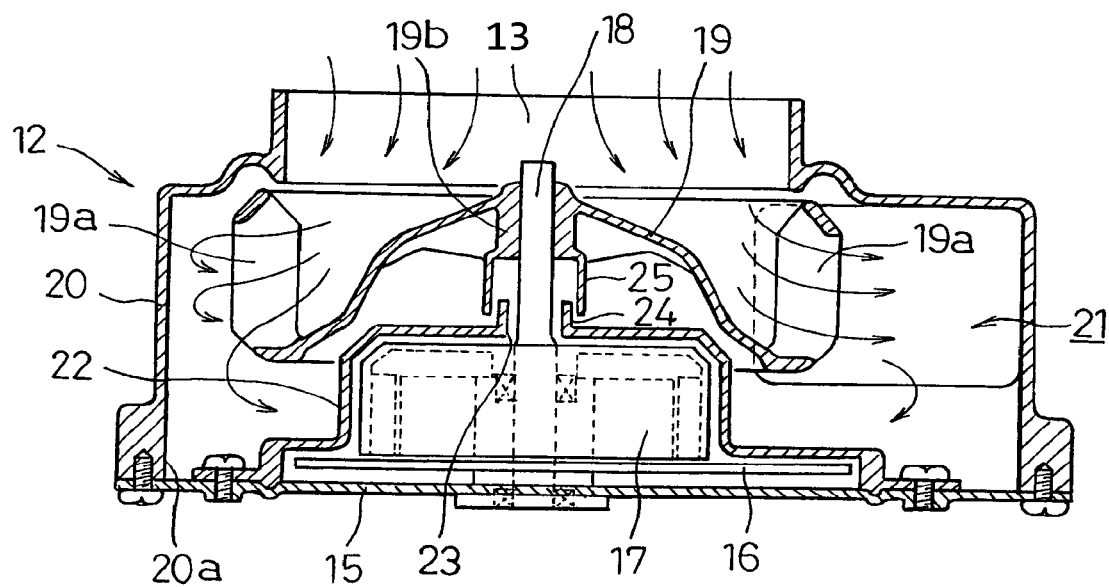
FIG. 3 is a longitudinal cross-sectional front view of a modified example of the fan of the first embodiment.

While FIG. 2 illustrates one example of the labyrinth structure 26 formed by the cylindrical seal 25 securely attached to the output shaft 18, the cylindrical seal 25 may be provided as a downward extension from the attachment boss 19b that is provided to attach the bladed wheel 19 on the output shaft 18, as shown in FIG. 3. This way, the number of components is reduced and a cost reduction is achieved.

Figure 4:
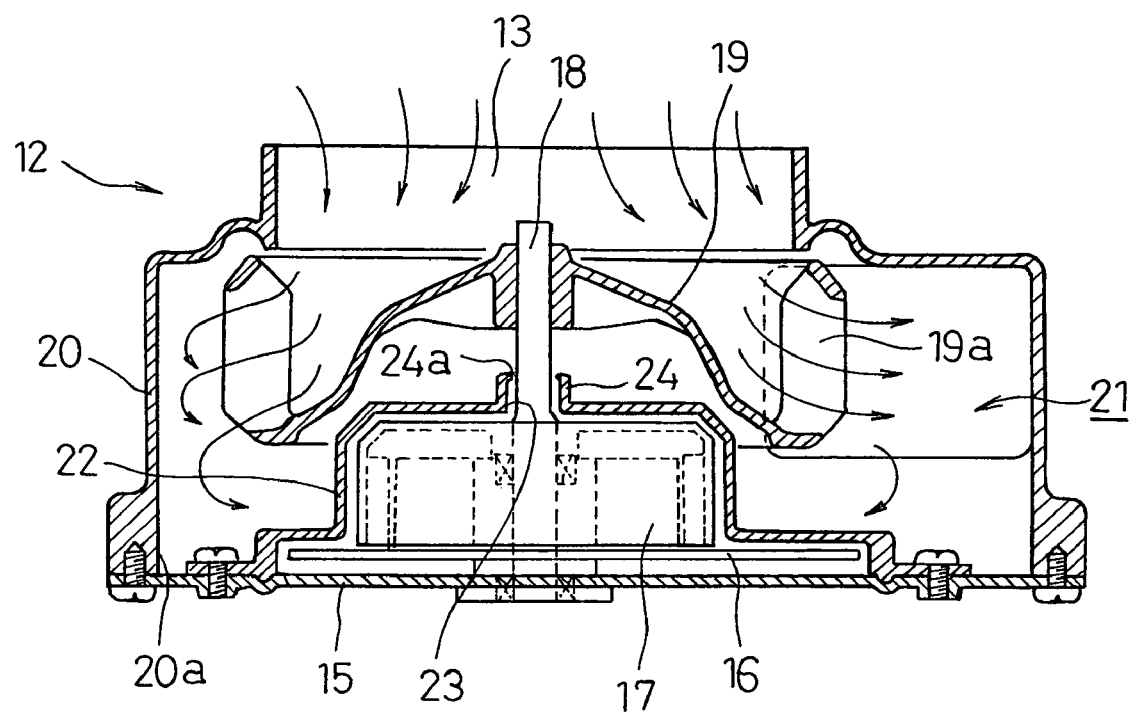
FIG. 4 is a longitudinal cross-sectional front view of another modified example of the fan of the first embodiment.

The above example of the labyrinth structure 26 is formed around the hole 23 at the top of the waterproof member 22 through which the output shaft 18 extends. FIG. 4 shows an alternative design. A cylindrical part 24 extending upwards from the hole 23 in the waterproof member 22 includes a thin part 24a at the top that forms a small gap between itself and the circumference of the output shaft 18 or makes slight contact with the output shaft 18. This way, the structure is further simplified.

Next, a battery pack employing the fan structure according to a second embodiment of the present invention will be described with reference to FIG. 5 and FIG. 6.

Figure 7:
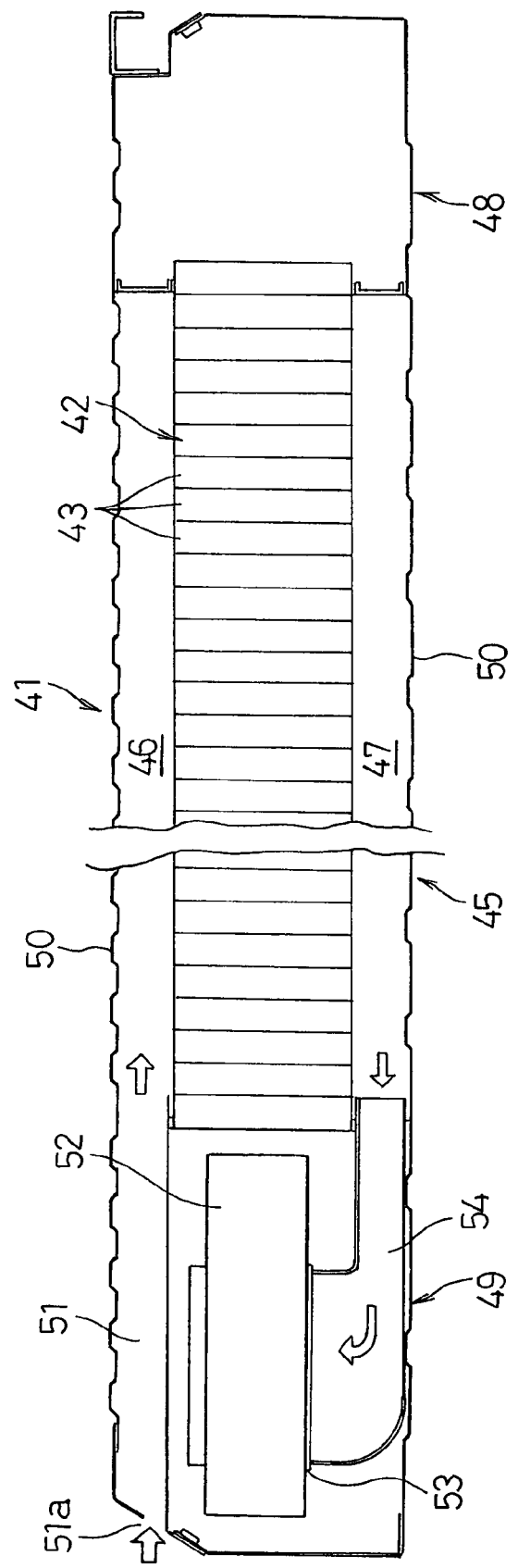
FIG. 7 is a longitudinal cross-sectional front view of a battery pack in which a conventional fan is installed.
Figure 8:
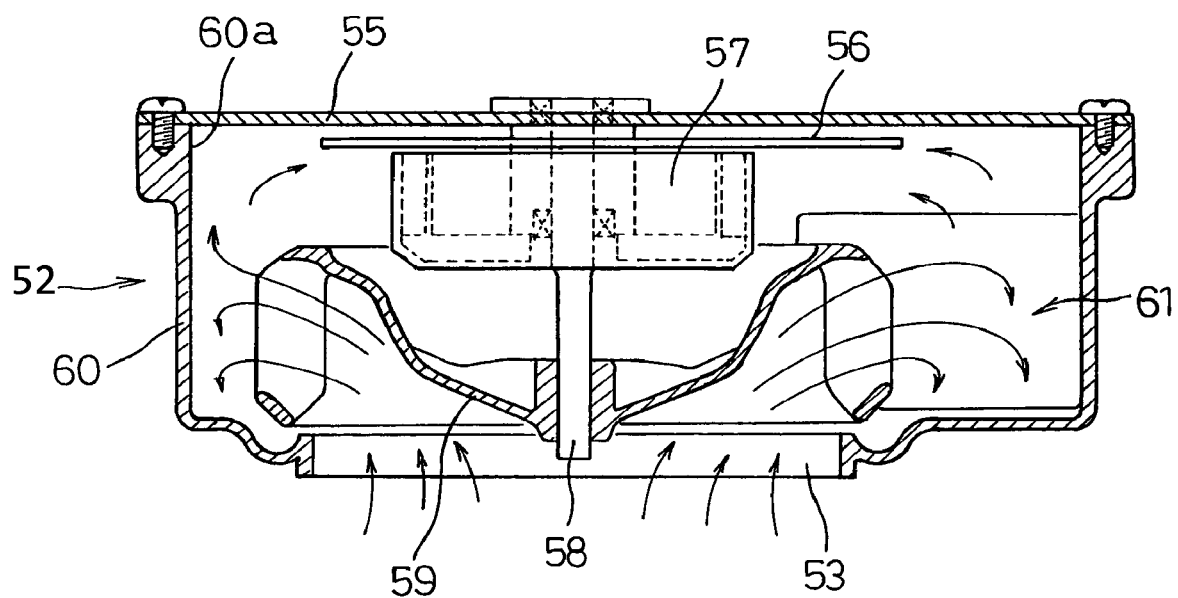
FIG. 8 is a longitudinal cross-sectional front view of the conventional fan.

In the first embodiment shown in FIG. 1, the supply passage 6 is arranged below the batteries and the discharge passage 7 is arranged above the batteries, and accordingly, the base plate 15 is at the bottom of the fan 12 while the inlet 13 is opened upward at the top. In the following embodiment, the supply passage 6 and the discharge passage 7 are arranged in the upper part and in the lower part, respectively, of the battery pack 1 similarly to the prior art example described with reference to FIG. 7, and therefore the structure of the fan 12 is upside down as shown in FIG. 5 relative to that of the previous embodiment.

Figure 5:
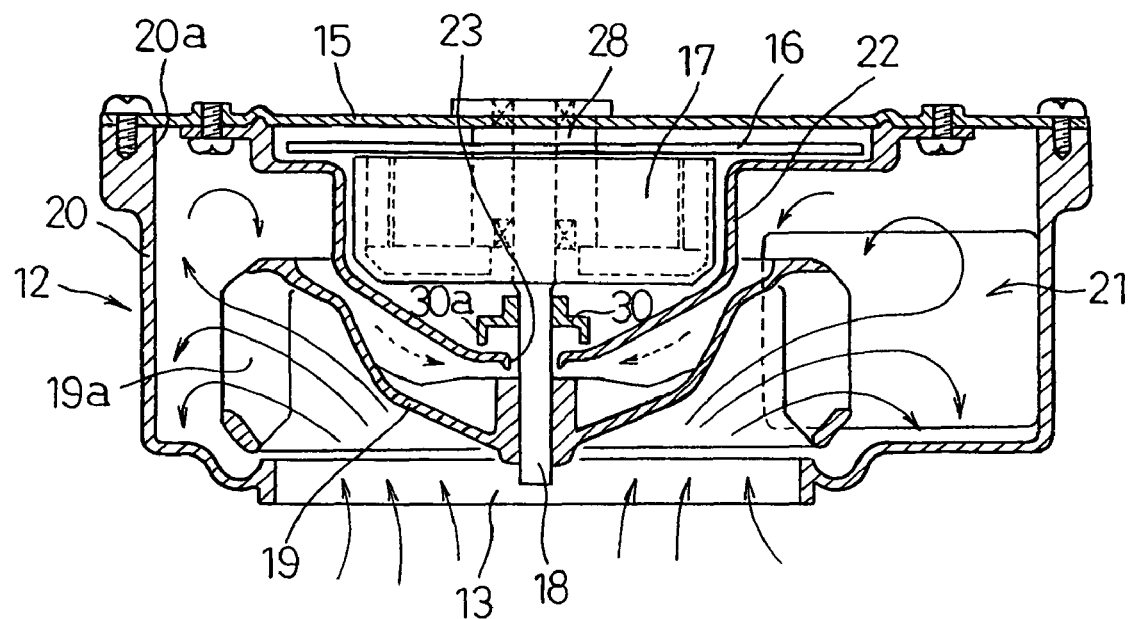
FIG. 5 is a longitudinal cross-sectional front view of a fan installed on a battery pack according to a second embodiment of the invention.

Referring to FIG. 5, the base plate 15 is arranged at the top of the fan 12, and the open end 20a of the fan case 20 is securely joined to the base plate 15. The inlet 13 is opened downwards at the bottom of the fan case 20. The inner structure of the fan 12 is basically the same as that of the previous embodiment and therefore will not be described again. Main differences only will be described below.

Figure 6:
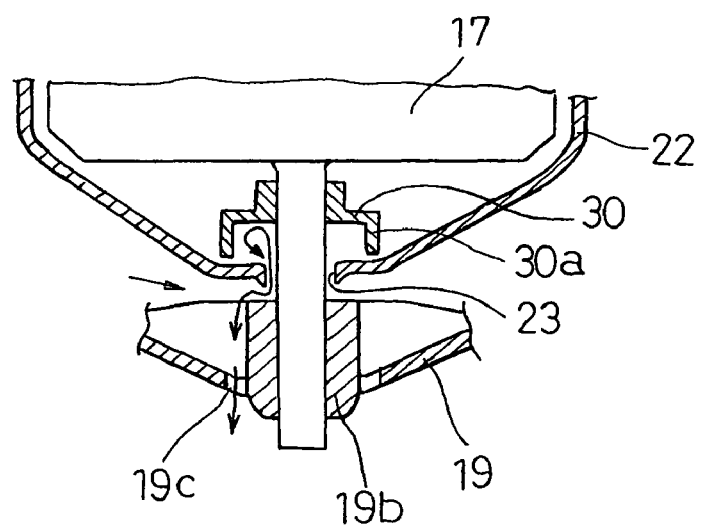
FIG. 6 is a detailed cross-sectional view illustrating chief elements of the fan of the second embodiment.

In this embodiment, as shown in FIG. 6 in detail, a hole 23 is formed at the lower end of the waterproof member 22 for the output shaft 18 to extend through. A flashing member 30 having a suspended part 30a around the circumference is arranged inside the waterproof member 22 opposite the hole 23, the flashing member 30 being attached to the output shaft 18 of the motor 17. A drain hole 19c is formed in the bladed wheel 19 near the attachment boss 19b.

With the fan 12 having its base plate 15 arranged at the top, this embodiment provides the same effects as those of the previous embodiment. Even when seawater mist enters inside the waterproof member 22 through the gap between the hole 23 and the output shaft 18, the mist collides with the flashing member 30, returns downwards, and exits through the gap as indicated by the arrows in FIG. 6. The mist is then discharged from the drain hole 19c in the bladed wheel 19 and through the inlet 13 to the outside. Therefore, short-circuiting or other malfunctions that may be caused by adhesion of such salt, water, or dust on the circuit substrate 16 are prevented.

As described above, the fan structure of the invention has a compact design wherein the circuit, the motor, and the bladed wheel are accommodated in the fan case. As the motor and the circuit substrate are divided by the waterproof member from the scroll housing where a fluid flows, the circuit substrate is protected even when sucked fluid contains salt, water, or dust such as seawater mist, and short-circuiting or other malfunctions that may be caused by adhesion of salt, water, or dust on the circuit substrate are prevented. Therefore, the invention is particularly suitable for battery packs mounted on vehicles.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A fan structure comprising:

a fan case having an inlet and an outlet;

a bladed wheel provided inside the fan case;

a motor for rotating the bladed wheel;

a circuit substrate for controlling the motor, the circuit substrate and the motor being arranged inside the fan case;

a scroll housing formed between the fan case and the bladed wheel, rotation of the bladed wheel causing a fluid to enter the scroll housing from the inlet and to exit from the outlet;

a waterproof member for dividing the motor and the circuit substrate from the scroll housing, the waterproof member having a hole formed therein through which an output shaft of the motor extends, the waterproof member comprising a part that extends up from the hole, wherein the part extending up from the hole does not contact the output shaft; and a sealing part fixedly attached to the output shaft, the sealing part for sealing the hole of the waterproof member, wherein the sealing part includes:

an attachment boss secured to the output shaft, wherein the attachment boss extends downward to fit between the part of the waterproof member and the output shaft; and a cylindrical portion extending from the attachment boss that fits with the part of the waterproof member with a gap being formed between the sealing part and the part of the waterproof member, the gap further formed around an inner circumference of the part and around an outer circumference of the part and at a top of the part.

2. The fan structure according to claim 1, wherein:

the fan case comprises a base plate opposite the inlet; and the motor, the circuit substrate, and the waterproof member are secured to the base plate.

3. The fan structure according to claim 1, wherein the sealing part is composed of a sealing member that is secured to the output shaft of the motor and covers the hole from the side of the scroll housing.

4. The fan structure according to claim 3, wherein the waterproof member and the sealing member form a labyrinth structure.

5. The fan structure according to claim 2, wherein:

the base plate is arranged at the top;

the inlet of the fan case is arranged downward;

the sealing part is composed of a flashing member having a suspended part around a circumference thereof, the flashing member being secured to the output shaft of the motor opposite the hole inside the waterproof member.

6. A battery pack comprising:

a battery assembly including a plurality of parallel arranged rechargeable batteries with cooling passages formed between the batteries;

a supply passage for supplying a cooling fluid to the cooling passages;

a discharge passage for discharging the cooling fluid from the cooling passages; and the fan according to claim 1, the fan arranged on one side of the battery assembly, the inlet being connected to either the supply passage or the discharge passage.

7. A battery pack comprising:

a battery assembly including a plurality of parallel arranged rechargeable batteries with cooling passages formed between the batteries;

a supply passage for supplying a cooling fluid to the cooling passages;

a discharge passage for discharging the cooling fluid from the cooling passages; and the fan according to claim 2, the fan arranged on one side of the battery assembly, the inlet being connected to either the supply passage or the discharge passage.

8. A battery pack comprising:

a battery assembly including a plurality of parallel arranged rechargeable batteries with cooling passages formed between the batteries;

a supply passage for supplying a cooling fluid to the cooling passages;

a discharge passage for discharging the cooling fluid from the cooling passages; and the fan according to claim 3, the fan arranged on one side of the battery assembly, the inlet being connected to either the supply passage or the discharge passage.

9. A battery pack comprising:

a battery assembly including a plurality of parallel arranged rechargeable batteries with cooling passages formed between the batteries;

a supply passage for supplying a cooling fluid to the cooling passages;

a discharge passage for discharging the cooling fluid from the cooling passages; and the fan according to claim 4, the fan arranged on one side of the battery assembly, the inlet being connected to either the supply passage or the discharge passage.

10. A battery pack comprising:

a battery assembly including a plurality of parallel arranged rechargeable batteries with cooling passages formed between the batteries;

a supply passage for supplying a cooling fluid to the cooling passages;

a discharge passage for discharging the cooling fluid from the cooling passages; and the fan according to claim 5, the fan arranged on one side of the battery assembly, the inlet being connected to either the supply passage or the discharge passage.

* * * * *